(12) United States Patent
Liedes et al.

(10) Patent No.: US 7,587,429 B2
(45) Date of Patent: Sep. 8, 2009

(54) METHOD FOR CHECKPOINTING A MAIN-MEMORY DATABASE

(75) Inventors: Antti-Pekka Liedes, Espoo (FI); Petri Soini, Vantaa (FI)

(73) Assignee: Solid Information Technology Oy, Helsinki (FI)

( * ) Notice: Subject to any disclaimer, the term of this patent is extended or adjusted under 35 U.S.C. 154(b) by 396 days.

(21) Appl. No.: 10/851,214

(22) Filed: May 24, 2004

(65) Prior Publication Data
US 2006/0004860 A1  Jan. 5, 2006

(51) Int. Cl.
*G06F 12/00* (2006.01)
(52) U.S. Cl. .................. 707/202; 707/204; 707/203; 711/162; 714/15
(58) Field of Classification Search .................. 707/202
See application file for complete search history.

(56) References Cited

U.S. PATENT DOCUMENTS

| | | | | |
|---|---|---|---|---|
| 5,864,849 A | * | 1/1999 | Bohannon et al. | 707/8 |
| 5,881,379 A | * | 3/1999 | Beier et al. | 707/101 |
| 6,108,671 A | * | 8/2000 | Ogawa | 707/204 |
| 6,154,847 A | * | 11/2000 | Schofield et al. | 714/4 |
| 6,560,614 B1 | * | 5/2003 | Barboy et al. | 707/201 |
| 6,578,041 B1 | * | 6/2003 | Lomet | 707/102 |
| 2002/0103814 A1 | * | 8/2002 | Duvillier et al. | 707/202 |
| 2003/0056143 A1 | * | 3/2003 | Prabhu | 714/13 |

* cited by examiner

*Primary Examiner*—Christian P. Chace
*Assistant Examiner*—Christyann R Pulliam
(74) *Attorney, Agent, or Firm*—Young & Thompson

(57) ABSTRACT

Method for making a consistent checkpoint of a page including at least one data object in a computer system having a primary and secondary storage, and a programmable software. The primary storage has at least one page which includes at least one original data object on the page. The computer system allows at least one write operation to modify at least one data object, and the page is written into the secondary storage during checkpointing. The method includes beginning the checkpointing, including at least one page in the primary storage into a group of pages to be checkpointed, altering at least one data object with at least one data write operation, marking at least one data object resulting from the data write operation, writing at least one of the data objects into the secondary storage, and altering the state of the pending data object to be the original data object.

29 Claims, 11 Drawing Sheets

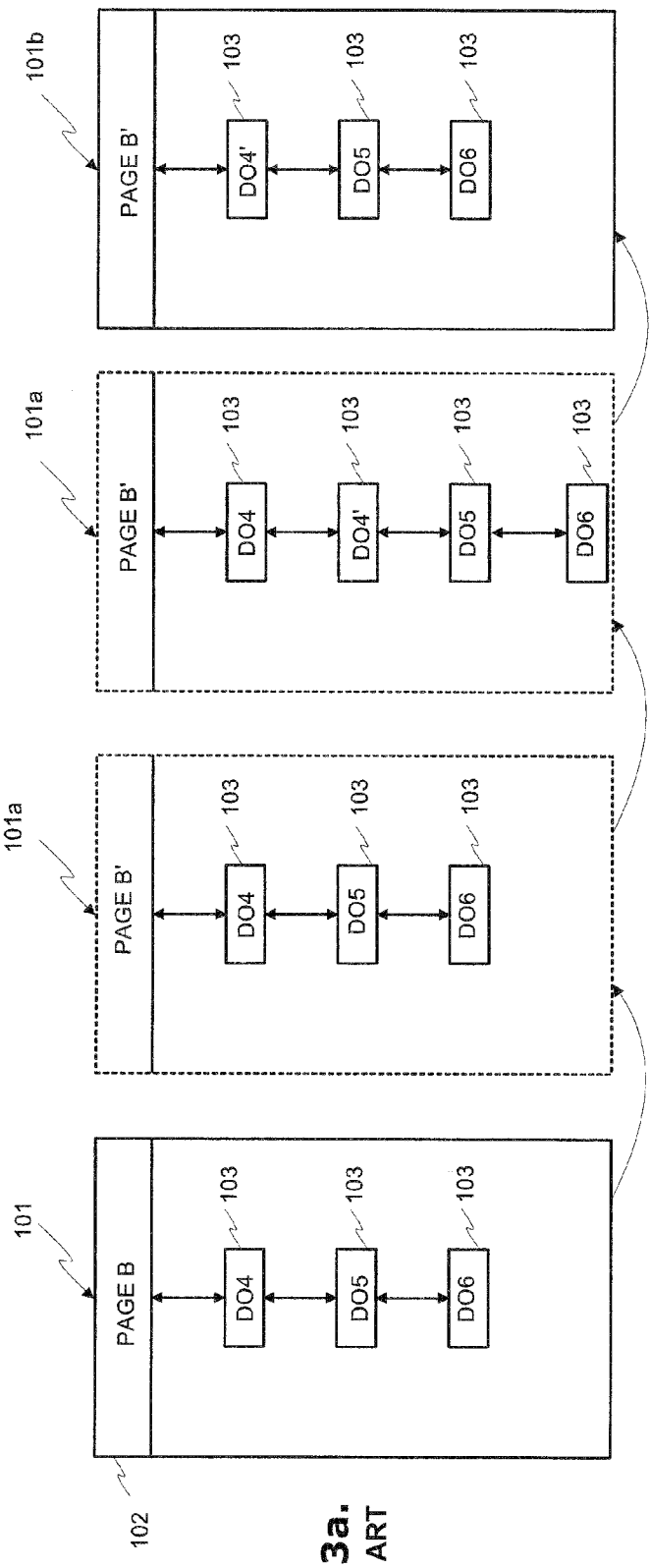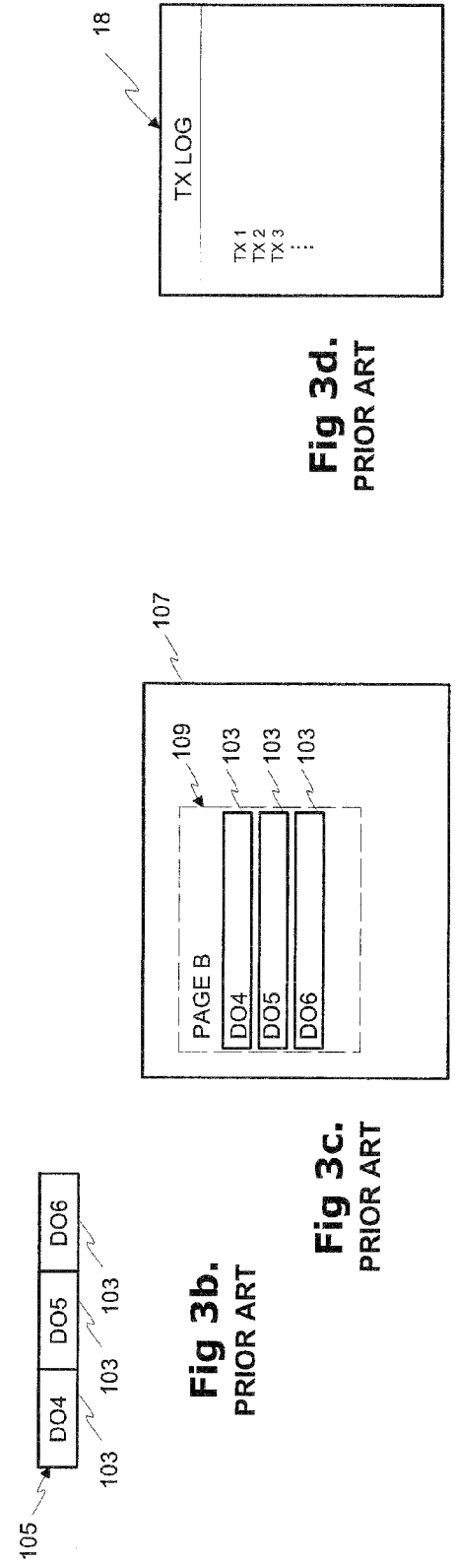
Fig 3a. PRIOR ART
Fig 3b. PRIOR ART
Fig 3c. PRIOR ART
Fig 3d. PRIOR ART

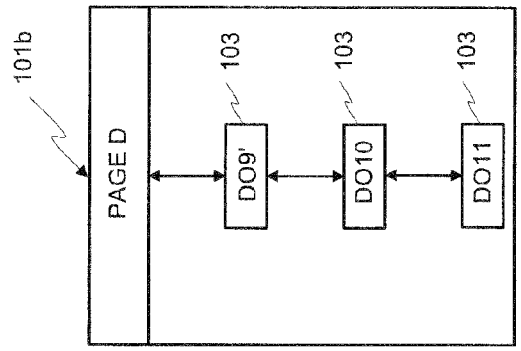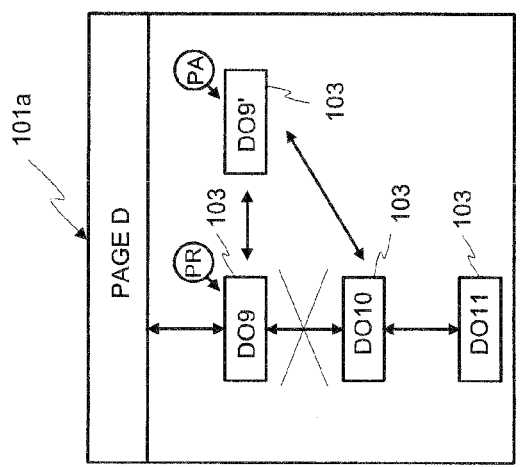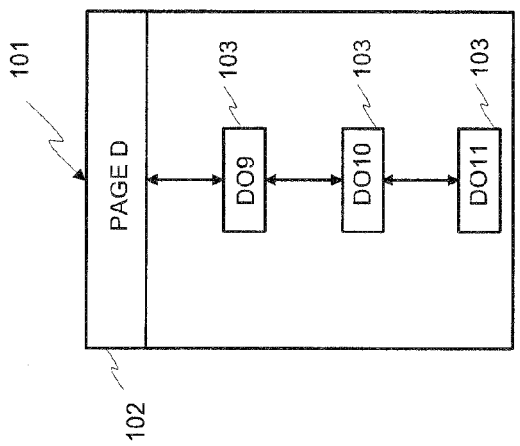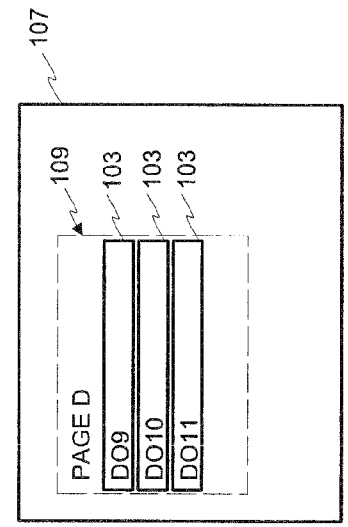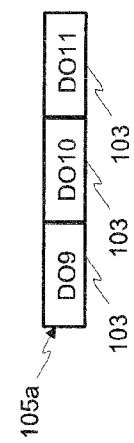
Fig 5a.
Fig 5b.
Fig 5c.

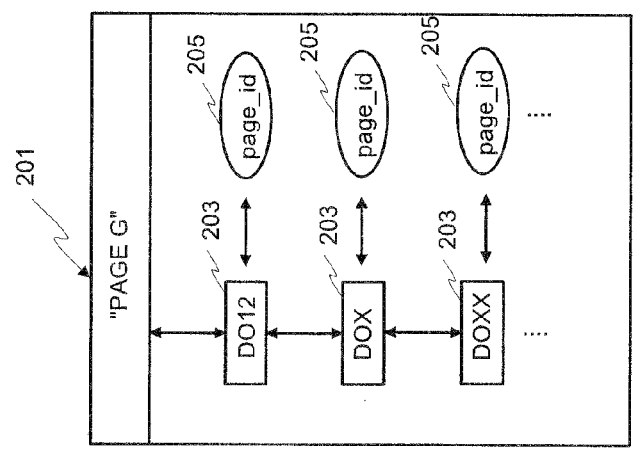
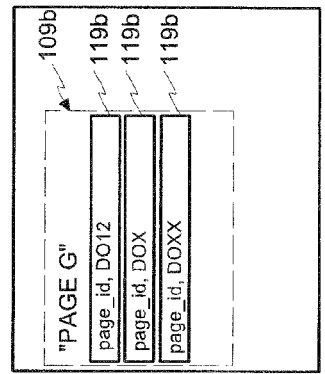
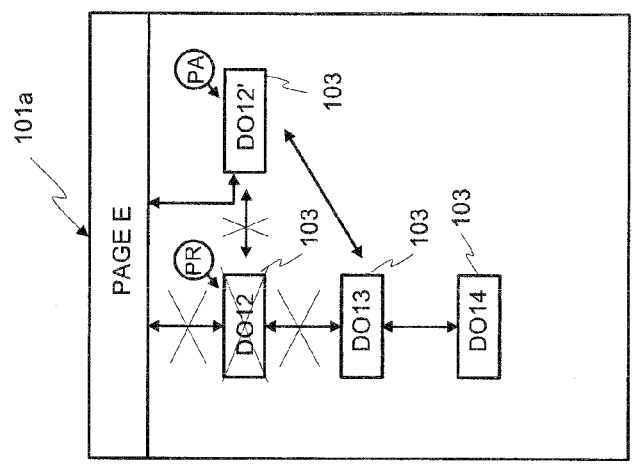
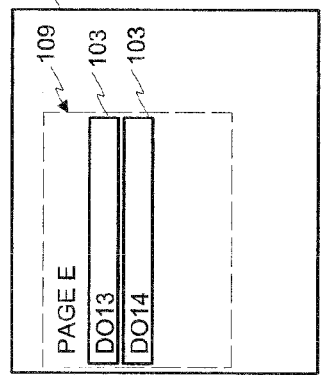
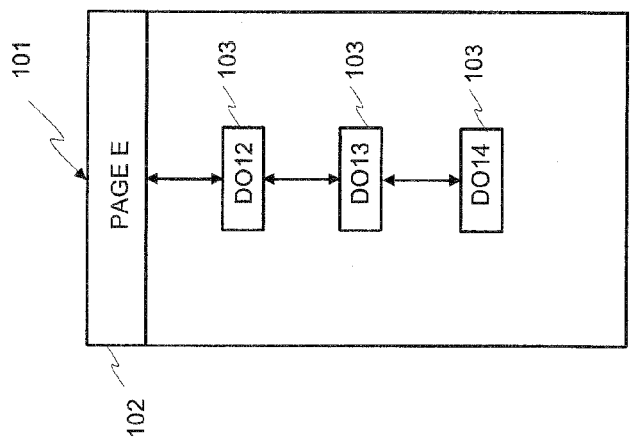
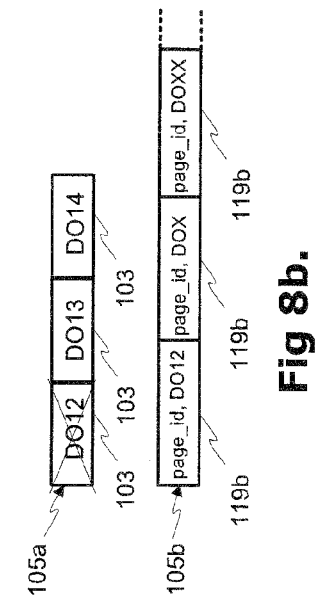
Fig 8a. Fig 8b. Fig 8c. Fig 8d.

METHOD FOR CHECKPOINTING A MAIN-MEMORY DATABASE

TECHNICAL FIELD OF THE INVENTION

This invention relates generally to a computer based system comprising primary and secondary storages and storage level software processes, and more particularly to a main-memory relational database management system (DBMS) and related software processes in which new data is allowed while consistently checkpointing the database.

BACKGROUND OF THE INVENTION

The database management system (DBMS) is a facility for storing large volumes of data and allowing multiple users to access and manipulate the data in an efficient and controlled fashion. Databases are traditionally considered as a large collection of (mainly disk-resident) shared data, managed and accessed by the DBMS.

In this application the following notions are used:

A database management system (DBMS) is an entity, which comprises one or more databases and/or data management systems, whereby the system is responsible for reading the data structures contained in the database and/or data management systems and for changing these data structures.

A database is an information structure, which comprises one or more data objects, and the use of which is controlled by the DBMS.

A data object is an information structure, which can comprise other data objects or such data objects, which can be construed as atomary data objects. For instance, in a relational database data objects represent tables comprising rows. The rows comprise fields, which are typically atomary data objects. A tuple is the data object that may contain other objects as elements, e.g. a tuple may be one row containing single customer's data in a table.

A database operation is an event, during which data objects of the database are read from the database, during which data objects are modified, during which data objects are removed from the database, and/or during which data objects are added to the database. A set of database operations acting on the data objects is called a transaction. The transaction may comprise one or multiple operations. The transaction can also comprise other transactions.

A page is a collection of data objects. A page may contain zero, one or multiple data objects. At maximum, the page may contain all data objects of the storage.

A database table is a collection of zero or more data objects referred to as table rows.

A checkpoint is a process where altered pages are written from one storage unit, such as RAM to another storage unit such as Disk. Typically, the end-result of a checkpoint is a snapshot of a database on the disk.

Referring to FIG. 1a there is depicted a common relational DBMS arrangement comprising a database server 12 and database file unit 16. The database server comprises a primary storage unit 10 and a CPU unit 13. The database file unit 16 is a disk-based system where the persistent database data resides and it is called a secondary storage. At the transactional level the application software unit 11 communicates with the database server 12 using appropriate programming interface, e.g. Structured Query Language (SQL), transactions (a in FIG. 1a) being able to access the primary storage. Once the transaction is successfully finished, i.e. committed (c in FIG. 1a), in the database a transaction log 18 in the secondary storage will be updated appropriately if transaction logging feature has been switched on. The database file 16 and the transaction log file 18 may reside in the same or different disk device. Preferably, the data must be persistent which means that the data is recoverable after a system shutdown. To ensure that the data is persistent in the database there is used checkpointing (b in FIG. 1a) to periodically flush changed data from primary storage unit 10 to the database files 16. The purpose of the checkpointing is to provide a snapshot of the data of the database in the database files within the database file unit 16. According to the prior art both the checkpointing and transaction logging are used to recover the data in the database in case of uncontrolled DBMS shutdown which is often referred to as a crash, and can be caused by an application failure, an operating system failure, a hardware failure, or other such failure. The database is thought to be persistent, if after a single fault, i.e. failure in any of the components of the DBMS, the data is recoverable from the secondary storage.

In traditional disk-based DBMSs the database server 12 comprises a disk unit as a primary storage unit and a random access memory (RAM) unit as a cache memory unit. The RAM unit is used as a buffer cache to the actual data on the disk of the database file unit 16. If the accessed data is not in the cache, it has to be fetched from the disk and it may take several milliseconds for the disk to seek and fetch the data. These disk-based relational DBMSs are also called disk-resident DBMSs, abbreviated as DRDBMS. To generalize, in DRDBMSs the data resides on the disk and is cached into RAM.

Today main-memory DBMSs, abbreviated as MMDBMS, are strengthening their position. Both terms main-memory and in-memory are widely used and they mean the same thing in the context of DBMSs. In MMDBMSs the database server 12 comprises a random access memory (RAM) unit as a primary storage unit 10 where all data of the database is stored. Database files are contained with the database file unit 16 and transaction logs 18 provides a persistent backup of the data of the database. To generalize, in MMDBMSs the data resides in RAM and is backed up to the disk.

This present application concerns MMDBMSs. With ever increasing RAM sizes in modern computers, there has been a rise given to the database residing entirely in the main-memory RAM instead of disks. Compared to the disk, the RAM offers superior performance by offering much better access times in the range of hundred nanoseconds on the average. Also the maximum access time for the RAM is easy to define, whereas for the disk having a physically moving read/write head, this is difficult to accomplish. Disks are block-oriented meaning that reading and writing a relatively large amount of data has the same, high cost as reading or writing a single byte. For RAM the optimum access patterns are decided by cache memory units but a typical cache line size is very small, from tens of bytes to a couple of hundred bytes.

In this application the term RAM means the same as the main-memory, because RAM is the method to implement the main-memory, i.e. the primary storage unit 10. The secondary storage is provided in the database file unit 16 is referred to as the disk, even though the disk is only one way to implement it among other block-oriented means having similar properties as disks, e.g. a flash-RAM. Also the transaction log 18 resides in the secondary storage.

The checkpoint, in general, is any identifier or other reference that identifies a point in time or a state of the database. The checkpointing can be divided into two major classes, namely transaction consistent and non-consistent checkpointing. In transaction consistent checkpoints for all transactions all actions of the transaction are either completely or not at all included. In non-consistent checkpoints actions and transactions can be partially included. Because read actions don't modify the data, we can mostly ignore them when considering checkpoints. The checkpointing process is typically a special thread process that periodically performs the checkpointing of the database. There are different ways of triggering the beginning of the checkpoint, e.g. it can start whenever the transaction log has accumulated a predetermined amount of records since the previous checkpoint. The term backup is often used as a synonym for the checkpointing of especially main-memory databases.

Referring to FIGS. 2a-2c there is depicted a common database structure for modifying and checkpointing data in the relational MMDBMS according to the prior art. As shown in FIG. 2a the primary storage contains a page A 101 comprising a page header 102 and data objects 103, e.g. in this case DO1, DO2 and DO3. The page A may contain a plurality of data objects but in this example a set of three data objects is used for simplicity. The page A may not actually be a physical contiguous area of the main-memory but it is in a form of a logical page which is a linked list of data objects floating around the main-memory, When the checkpointing process begins, this means in the storage level that in the beginning a number of pages are included in the current checkpoint but they are not yet written to the secondary storage. The writing of the pages of the checkpoint is a time consuming process during which, there may be transactions that need to modify the data of the pages of the check-point, for example updating one or multiple data objects on the page A. The modification of data objects of the page A in transaction level is omitted from FIGS. 2a-2c for simplicity.

FIG. 2b shows a situation in the storage level the first step of a typical checkpointing method for a main-memory database. When the checkpointing process starts processing the page A, the page is copied in the primary storage so that the page A is presented as a physical page 105 forming a physical contiguous area of the main-memory in primary storage unit 10. The page A 105 comprises data objects DO1, DO2 and DO3 arranged contiguously in a sequential order. Subsequently, the checkpointing process writes the page A to the secondary storage within the database file unit 16. As shown in FIG. 2c the page A 101 is finally written as a physical page A 109 to the memory space 107 of the disk file, where the page A 109 contains rows and each row contains one data object DO1, DO2 and DO3. When the page A 101 is written as the page A 109 to the secondary storage, it means that the page A 109 is a backup copy of the page A 101. In the simplest checkpointing methods, while checkpointing is active and the page has not yet been written to the secondary storage, and if there is a transactional request for data object modification on the page, for example updating a data object 103 on the page A, the transactional modification is quiesced until the checkpoint has completed writing the page(s) that the transaction needs to modify. After the checkpointing process has moved to process another page in the primary storage, the page A 101 can be modified, e.g. by a transactional update, in the primary storage.

To ensure the consistent checkpointing of the page 101, the modification of the page A is cancelled during the checkpointing and the modification has to wait until the checkpointing of the page A is completed. The checkpointing is not consistent if the page A is written (terms copied or dumped area also used) to the disk while transactions are allowed to modify any data on the page A during the checkpointing. In this case, the checkpointing may be partially consistent, e.g. action consistent, but transaction consistent checkpointing provides all actions of the transaction to be consistent. Otherwise the checkpointing as a whole is considered non-consistent. Consequently, if a consistent checkpointing is a requirement, then during the consistent checkpointing the data to be modified is locked in the main memory (primary storage) for writing to the disk (secondary storage). Thus, transactions are not able to perform write operations without waiting for the disk access which slows down is database operations and a constraint for real-time operation is not met.

Referring now to FIGS. 3a-3d there is depicted another way of the prior art to make a consistent checkpointing while modifying data during checkpointing the relational MMDBMS. As shown in FIG. 3a the primary storage contains a page B 101 comprising a page header 102 and a number of data objects 103, e.g. in this case DO4, DO5 and DO6. The page B is in a form of a logical page which is a list of data objects DO4, DO5, DO6 floating around the main-memory. When the checkpointing of the database begins, this means in the storage level that the page B 101 is included in the current checkpoint but it is not yet written to the secondary storage. FIG. 3b shows page B 105 with data objects arranged contiguously. Meanwhile there is a transactional request for page modification, for example updating the page B or a data object 103 on the page B, in the transaction level.

FIG. 3a also shows a situation in the storage level, when the first transactional modification to the page B occurs. The page B 101 is copied in the primary storage to a page B' 101a. The page B 101 comprises data objects DO4, DO5 and DO6 that need to be written to the secondary storage in the checkpoint. Meanwhile the transactional request for page modification, for example adding or removing a data object 103 on the page B' 101a, is accepted and consequently, the transactional modification of the page B is allowable during the checkpointing. When the first transactional modification to the page B during checkpointing occurs, the current page B is copied to the main memory (primary storage) as a page B' 101a which is initially an identical copy to the page B. Now the page B' comprising data objects DO4, DO5, DO6 may be altered by transactional operations such as add or remove a data object. Lets presume that in the meanwhile the transactional request for page modification, for example updating the data object DO4 on the page B' to be replaced by a new data object DO4' is allowed. After the copy of the page B, as the page B', is ready in the primary storage, the transactional modification is performed to page B' 101a, i.e. the data object DO4 will be replaced by the new data object DO4' in this exemplary case. Now the page B' first comprises data objects DO4, DO4', DO5, DO6 as shown in a dash-lined box of page B' 101a in FIG. 3a. After the transactional modification is committed at the transaction level during the current checkpointing, the data object DO4 is replaced by the new data object DO4' and the data object DO4 is removed in this exemplary case and finally the page B' 101a comprises data objects DO4', DO5, DO6 as shown in a block of page B' 101b in FIG. 3a. This means that there are in the main memory (primary storage) both the copy of the page B 101 and page B' 101b at the same time. As shown in FIG. 3a now the page B' 101b comprises data objects DO4', DO5, DO6 and the page B 101 data objects DO4, DO5, DO6. As consequence of this main memory resources are spent for both these page copies for a period of time until the checkpointing process has written the page B 101 to the secondary storage.

FIG. 3b shows a situation in the storage level for the first step of a typical checkpointing method for a main-memory database. When the checkpointing process starts processing the page B 101 the page is copied in the primary storage so that the page B 101 is presented as a physical page 105 forming a physical area of the main-memory in the primary storage.

When the page B 101 is being checkpointed, the checkpointing process writes the page B 101 to the secondary storage within the database file unit 16. As shown in FIG. 3*c* the original page B 101 is written as a physical page B 109 to the memory space 107 of the disk file, where the page B 109 resides containing data objects DO4, DO5 and DO6, i.e. it contains data of the original page B. When the page B 101 is written as the page B 109 to the secondary storage, it means that the page B 109 is a back-up copy of the page B 101 of the primary storage. In this case, when the checkpointing process moves to checkpoint another page in the primary storage, the page B' 101*a*, 101*b* is already or it can be modified, e.g. by a transactional update, in the primary storage. In the transaction level the transactions are free to perform whatever update operations, e.g. insert, update and/or delete, to the page B' that is a copy of the page B. An optional transaction log 18 as shown in FIG. 3*d* lists information on all transactional modification that have been committed during the database processing.

As a conclusion, according to the prior art the consistent checkpointing of the page 101, while a request for modification of the page occurs during the checkpointing, is guaranteed by using those two methods described above. The first method for ensuring the consistent checkpointing is depicted in FIGS. 2*a*-2*c*, where the modification of the page A is deferred during the checkpointing and the modification has to wait until the checkpointing is completed. The second method for ensuring the consistent checkpointing is depicted in FIGS. 3*a*-3*d*, where the request for modification of the page B involves the page B to be copied to the main memory (primary storage) as a page B' which is initially an identical copy to the page B. After the copy of the page B, as the page B', is ready in the primary storage, the transactional modification is performed to page B'.

FIGS. 4*a*-4*d* show a way of the prior art to make a so-called non-consistent checkpointing while modifying data during checkpointing the relational MMDBMS. As shown in FIG. 4*a* the primary storage contains a page C 101 comprising a page header 102 and a number of data objects 103, e.g. in this case DO7 and DO8 in a form of a logical page as described earlier. When the checkpointing of the database begins, this means in the storage level that the page C is included in the list of pages to be checkpointed but it is not yet written to the secondary storage. Meanwhile there is a transactional request for page modification, for example updating a data object 103 on the page C. The request is accepted and the transactional modification of the page C is allowable during the checkpointing. Let's presume that the transactional request for page modification, for example updating the data object DO7 on the page C to be replaced by a new data object DO7' is allowed. When the page C is copied in the primary storage, the transactional modification is performed to the page C 101, i.e. as shown in a block of page C 101*a* the data object DO7 will be replaced by the new data object DO7' and in pursuance of replacing the data object DO7 by DO7' it is also removed from the page C. There is no guarantee that the transactional modification is also committed at the transaction level. Now the page C 101 comprises data objects DO7', DO8 as shown in a block of page C 101*b* in FIG. 4*a*. FIG. 4*b* shows a situation in the storage level, when the first transactional modification to the page C occurs and the physical page C 105 as described earlier comprises now data objects DO7' and DO8. The checkpointing process writes the page C 105 to the secondary storage within the database file unit 16 as shown in the memory space 107 of the disk file of FIG. 4*c*. The backup copy of the page C 109 is not consistent with the original page C 101. If the database needs to be recovered from the checkpoint, the inconsistent pages of the database must be "repaired" with information about transactions that occurred during the checkpoint. An exemplary transaction log 18 as shown in FIG. 4*d* lists information on all transactional modification during the checkpointing to the secondary storage. Each row 118 of the transaction log contains following information concerning one transaction: a link to page C, an old version of the data object modified and a new version of the data object modified. This kind of transaction log of prior art is a physical undo-redo log, by means of which the database must be processed to be able to recover to the latest checkpoint. FIG. 4*c* shows a memory space 107 with page 109 and data object 103.

There are several disadvantages in the methods for making a consistent checkpointing of a relational MMDBMS described above. One of the main requirements for the MMDBMSs, as well as for any DBMSs, is that the data must be accessible and mutable with atomary, consistent, isolated and durable (ACID) transactions. For the transactions to meet real-time constraints, they must be able to perform read and write operations without waiting for a disk access. Even if the data is in the buffer cache, it is not necessarily mutable immediately, if the data is locked for writing to the disk as part of the DBMS persistency mechanism. The aforesaid method of the prior art does not fulfill these requirements, because ensuring the consistent checkpointing of the page the modification of the page is stopped during the checkpointing and it has to wait until the checkpointing is completed. The problem is that at the transactional level the modification operations are blocked during propagating the checkpointing at the storage level and consequently the real-time response for all database operations, especially write operations, is not guaranteed. This causes considerable delays to transaction level processing.

Other disadvantage is a main memory usage overhead caused by copying of pages during the checkpointing. The volatile RAM memory usage, on top of the user data, should be kept to a bare minimum compared to the disk space which is usually available in large quantities. The aforesaid method of the prior art copies the current page to the main memory (primary storage) as an identical copy to the page, when a transactional modification to the page B occurs during the checkpointing. Both the copy of the page and the original page is retained in the main memory until the checkpoint has been completed and as consequence of this main memory resources are spent for this extra page. Because each page to be checkpointed is copied upon the first write to the page, it is possible to double the memory consumption during the checkpointing. Furthermore, copying the whole page upon first write upon it causes all the data on the page, not only that which is written, to be copied, causing extraneous CPU usage.

Still another disadvantage in prior art checkpointing is the need to use a transaction log for recover the database. The traditional approach to the persistency in DBMSs is checkpointing and transaction logging. The checkpointing of prior art is tightly coupled to the transaction logging. The transaction log, in particular a physical undo-redo log, which is written to the secondary storage, must be processed to be able to recover from the latest checkpoint. The requirement of always using transaction logging to ensure database consistency is not always acceptable from the applications point of view primarily because transaction logging causes significant performance degradation of write transactions because all transactions must be successfully written to the disk upon transaction commit.

The problems set forth above are overcome by providing a consistent checkpointing of a main-memory storage, preferably a main-memory database, without disturbing the transaction level processing.

SUMMARY OF THE INVENTION

It is an object of the invention to provide a method for making a consistent checkpoint of a main-memory storage, wherein data modification is allowed during the checkpointing without slowing down a transaction level processing. Also an object of the invention is to provide savings in main-memory usage. It is another object of the invention to provide a programmable software product thereto.

The object of the invention is achieved by providing a method for making a consistent checkpoint of a main-memory storage, wherein a data object to be modified on the page comprising at least one data object is copied in the main-memory during the checkpointing, instead of the whole page to be copied. Another object of the invention is achieved by providing a programmable software product thereto.

In accordance with a first aspect of the invention there is provided a method for making a consistent checkpoint of at least one page in a computer system having at least one primary and at least one secondary storage, said primary storage having at least one page which comprises at least one data object on said page, the computer system allowing at least one write operation to modify at least one data object of the page, and said page being written into the secondary storage during the checkpointing, wherein the method comprises steps of:

beginning the process of checkpointing,
  including at least one page in the primary storage into a group of pages to be checkpointed,
  altering at least one data object of the page with at least one data write operation during checkpointing before the page has been checkpointed,
  marking said at least one data object resulting from said at least one data write operation as a pending data object,
  writing at least one of the data objects of the page into the secondary storage, and
  altering the state of said pending data objects.

In a one preferred embodiment of the invention a method comprises a step of altering at least one data object of said page is a pending operation of addition of the data object to the page.

Preferably, a data object is modified by a transactional database operation during the checkpointing.

In another preferred embodiment of the invention a method comprises a step of altering at least one data object of said page is a pending operation of removal of the data object from the page.

Preferably, a data object with a pending add operation is directly removed or modified by a remove or a commit operation.

In still another preferred embodiment of the invention a method comprises a step wherein the removed data object along with information related to the pending operation is moved from the page to a separate pending removals page in the primary storage.

In accordance with a second aspect of the invention there is provided a programmable software product for making a consistent checkpoint of at least one page comprising at least one data object in a computer system arranged To have at least one primary and at least one secondary storage, said primary storage arranged to have at least one page which comprises at least one data object on the said page, the computer system allowing at least one write operation to modify at least one data object of the page, and said page being written into said secondary storage during the checkpointing, wherein:

the process of checkpointing is arranged to begin,
  at least one page in the primary storage is arranged to be included into a group of pages to be checkpointed,
  at least one data object of said page is arranged to be altered with at least one data write operation during checkpointing before the page has been checkpointed,
  said at least one data object resulting from said at least one data write operation is arranged to be marked as a pending data object,
  at least one of the data objects of said page is arranged to be written into the secondary storage, and
  the state of said at least one pending data object is arranged to be altered.

In accordance with a third aspect of the invention there is provided a method for recovering at least one page comprising at least one data object from a consistent checkpoint in a computer system having at least one primary and at least one secondary storage, said secondary storage having at least one first page which comprises at least one data object and said secondary storage having at least one second page which comprises at least one data object having pending operation status of removal of the data object and information about the original location of the data object, wherein the method comprises steps of:

reading at least one data object from said first page in the secondary storage and writing said data object to the primary storage, and
  reading at least one data object from said second page in the secondary storage and adding said data object to its original location in the primary storage.

The benefits of the embodied invention are as follows. It provides a solution in which all data is readily available for transactions to both read and write operations during the consistent checkpointing, while offering high performance, guaranteed real-time response and acceptable memory usage overhead. It also provides a solution in which the checkpointing and transaction logging are fully decoupled meaning that it is possible to run the DBMS without logging at all, and still be able to recover from the latest checkpoint. Furthermore, even if transaction logging is enabled, it is possible to recover the database to the state of the most recent successful checkpoint without processing the log at all. In this case, all the transaction log before the beginning of the checkpoint should be discardable which saves the space consumption of the disk i.e. the secondary storage. The DBMS also allows arbitrarily long and complex transactions with possible user interaction.

These features are most beneficial in embodiments designed for telecommunications and embedded use.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An embodiment of the invention will be described in detail below, by way of example only, with reference to the accompanying drawings, of which

FIGS. 3a-3d depicts another block diagram of making a consistent checkpoint of the database according to prior art FIGS. 5a-5d depicts a block diagram of making a consistent checkpoint of the database according to an embodiment of the invention.

FIGS. 8a-8d depicts a block diagram of making a consistent checkpoint of the database according to another embodiment of the invention.

DETAILED DESCRIPTION OF THE INVENTION

Descriptions of FIGS. 1a, 2a-2c, 3a-3d and 4a-4d were given earlier in connection with the description of the state of art.

Figure 1A:
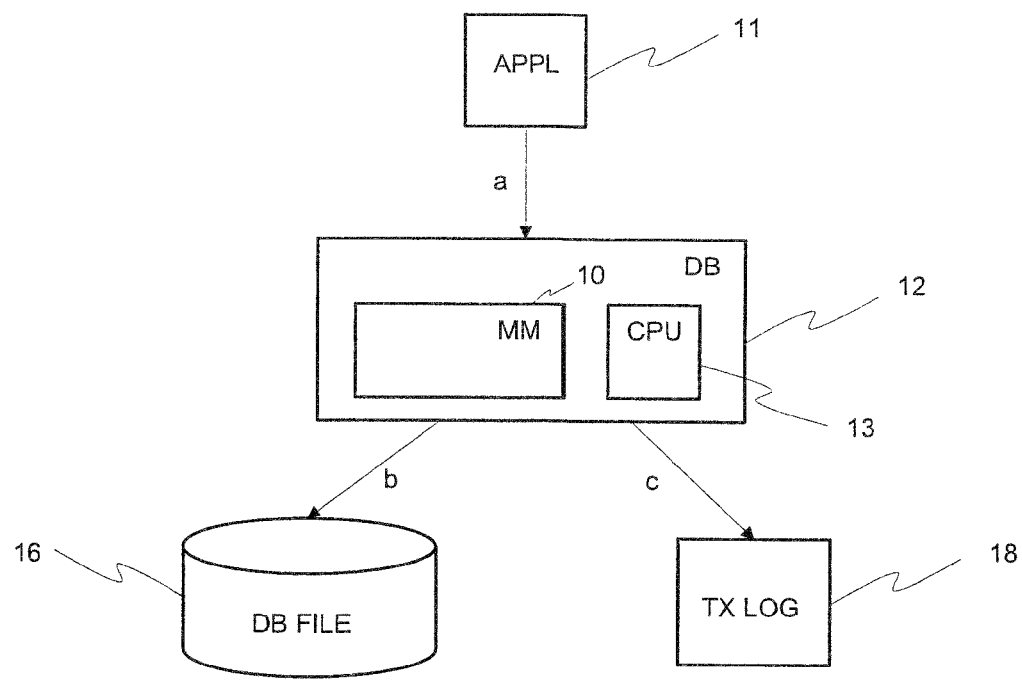
FIG. 1a depicts a common relational DBMS arrangement for storage level and transaction level processing according to prior art.
Figure 1B:
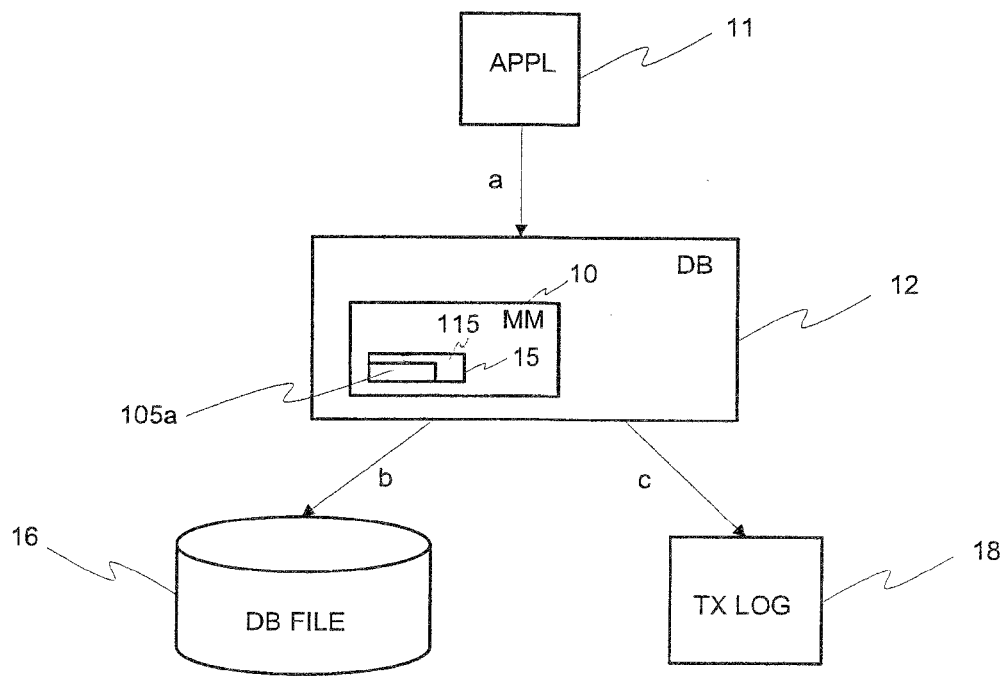
FIG. 1b depicts a common relational DBMS arrangement for storage level and transaction level processing according to the invention.
Figure 2A:
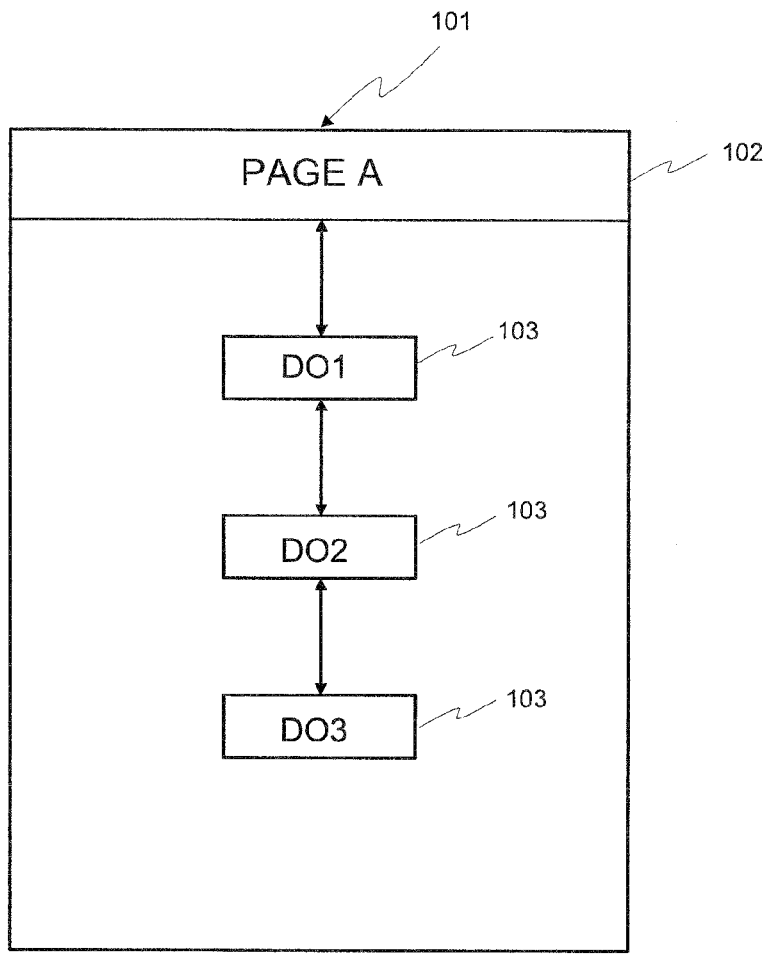
FIGS. 2a-2c depicts a block diagram of making a consistent checkpoint of the database according to prior art.
Figure 2B:
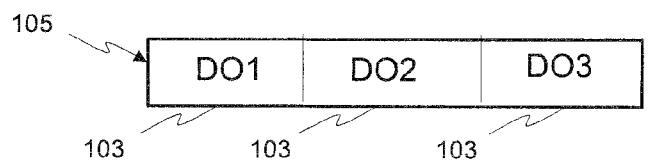
Figure 2C:
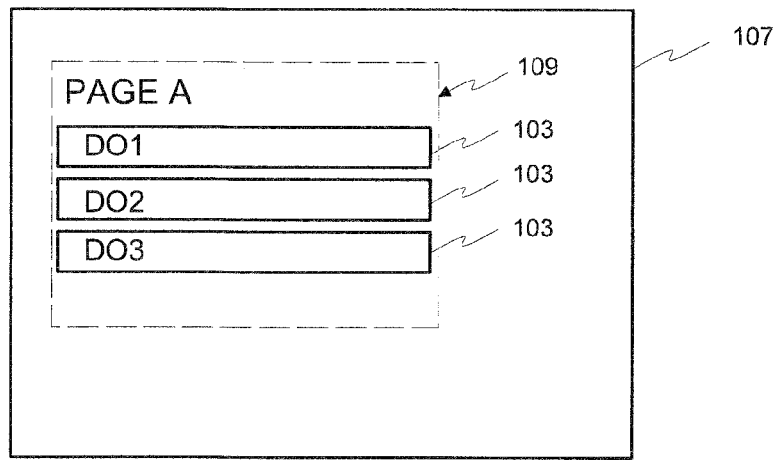
Figure 4A:
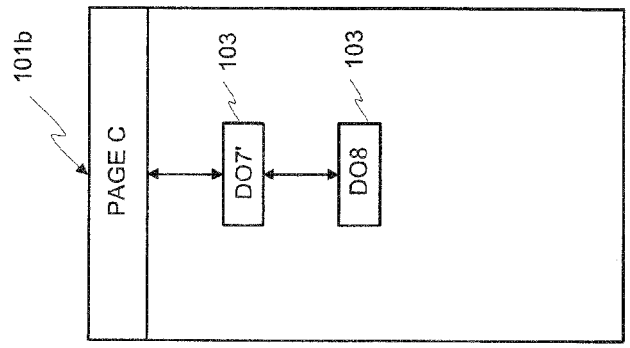
FIGS. 4a-4d depicts a block diagram of making a non-consistent checkpoint of the database according to prior art
Figure 4A:
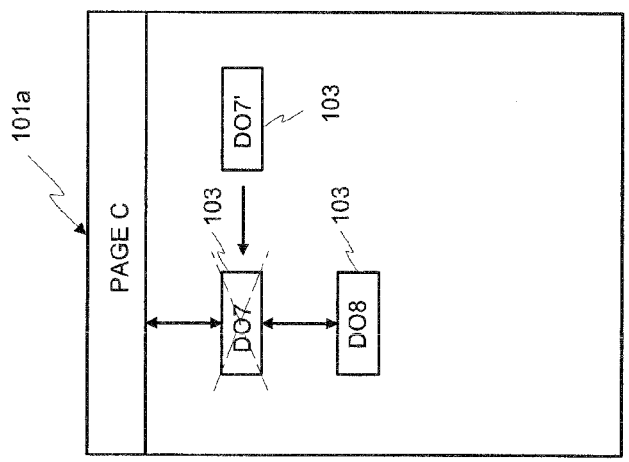
Figure 4A:
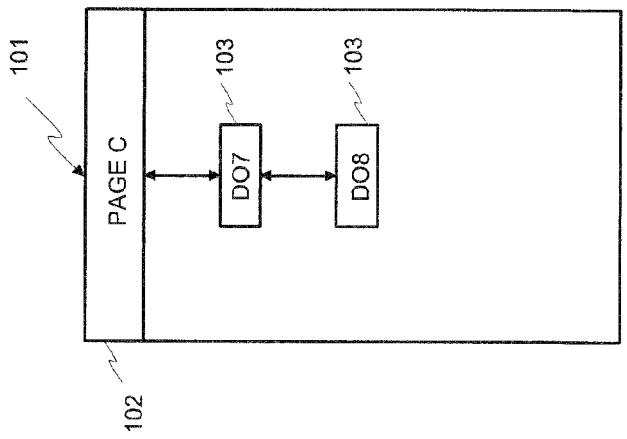
Figure 4B:
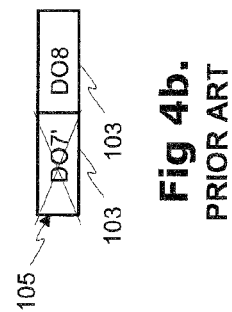
Figure 4D:
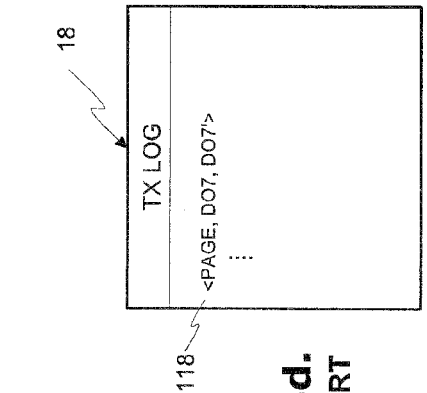
Figure 4C:
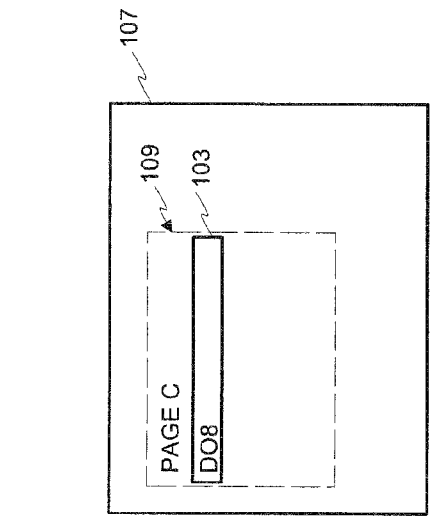

As an exemplary embodiment of a computer system according to the invention there is depicted in FIG. 1b a relational database management system (DBMS) arrangement. A relational DBMS arrangement according to the invention has a database server 12 comprising the primary storage unit 10 and database file unit 16 being the secondary storage. At the transactional level the general database processing is similar to as described in accordance with FIG. 1a. At the storage level the primary storage unit 10 is formed of pages, typically arranged into a doubly linked list. In the main-memory of primary storage unit 10 the page is in a form of a logical page which is a list of data objects floating around the main-memory. A memory location 15 is allocated in the main-memory for a disk page which represents a page on the disk. The page is presented as a physical page forming a physical contiguous area of the main-memory. In the main-memory the page has two things, firstly it is a buffer 115 for the page image on the disk and secondly a buffer location 105a of the disk page on the disk. The physical page is allocated for the disk page as the disk page is created. The data objects are copied into the buffer 115 of the disk page, the buffer is written to the disk (secondary storage) and released after writing. This is the only time the pages exist in their physical representation in the main-memory (primary storage). To make checkpointing more efficient a cyclic buffer 115 for the disk page is used. A transaction log 18 is depicted as an option. Connections a, b and c are described in pursuance of FIG. 1a. Application software unit 11 connects to database server 12.

In the checkpoint, only the pages that have been modified since the previous checkpoint need to be backed up. Each page contains a "dirty flag", which is set whenever the page is modified, and cleared when the checkpointing process writes the page to the disk. The pages to be backed up are those that are dirty when the checkpoint begins; any page that becomes dirty while the checkpointing is already on its way must not be backed up if a consistent checkpoint is desired. While a new checkpoint is underway, the old checkpoint must remain valid until the new checkpoint is finished successfully. To accomplish this, the dirty pages are written to new locations on the disk and their old versions from the previous checkpoint remain valid to keep the old checkpoint consistent. When the new checkpoint is completed, any old versions of the pages written in the new checkpoint become obsolete, and are marked as free on the disk. The pages from the old checkpoint that have not been modified, and thus were not written again by the new checkpoint, remain valid from the old checkpoint.

At the storage level there are three normal database operations for transactions. The "add data object" adds a new data object to the storage. The new data object may be a completely new data object, a new version for an existing data object, or a delete mark for an existing data object. The data objects are added as tentative, i.e. not transaction committed, data objects. The "remove data object" removes an existing data object, and the "commit data object" marks a data object as committed, i.e. non-tentative. "Update" and "delete" statements create new versions of the previously existing data objects, whereas "insert" statement creates completely new data objects. If more than one version of a certain data object is made within a transaction, e.g. a row is updated twice, the latest successfully statement committed version of each data object will be transaction committed If the transaction committed version is a delete mark, the data object is removed from the database.

According to the invention new versions of data objects are made by creating a new, altered copy of the previous version of the data object. Consequently, transaction and statement aborts are easy, just by forgetting the new versions and reverting the previous ones. The old versions of data objects must be readily available because other transactions must not see the data written to the database by another concurrently active transaction. A delete mark is a special data object. When the delete mark is transaction committed, the old transaction committed version and the delete mark cancel each other out. It is necessary to represent as a data object with enough information to locate the corresponding actual data object, because we need to find which data object is meant to delete in recovery. Old versions are only removed at transaction commit or abort. In commit, any old transaction committed versions replaced or deleted (replaced by the delete mark) by this transaction, and any intermediate versions created by this transaction but that didn't become transaction committed, are removed. In abort, only the versions created by the traction are removed and old versions from previous transactions remain as they are. When the checkpointing is not active, the operations are very straightforward, namely all changes to the storage are performed directly.

Next, the invention is described pursuant to an exemplary embodiment.

Figure 5D:
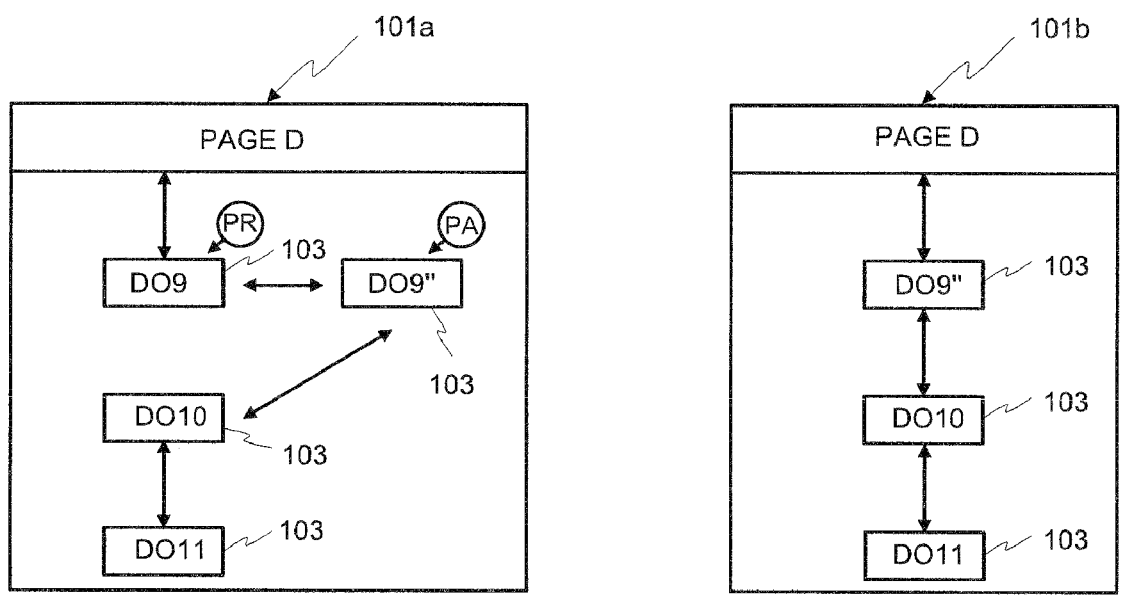

Referring to FIGS. 5a-5d there is depicted a database structure according to an embodiment of the invention to make a consistent checkpointing while modifying data during checkpointing the relational MMDBMS. As shown in FIG. 5a leftward, the primary storage contains a page D 101 comprising a page header 102 and a set of data objects 103, e.g. in this case DO9, DO10 and DO11. This is a situation at the beginning of the checkpointing process. The page D 101 contains some changes since the previous checkpoint and is therefore marked as a 'dirty page' that needs to be checkpointed. The page D is in a form of a logical page which is a list of data objects DO9, DO10, DO11 floating around the main-memory. When the checkpointing of the database begins, the page D is included in the current checkpoint but it is not yet written to the secondary storage. In other words, the pages to be backed up during this current checkpoint are "frozen" in the beginning of the checkpointing. The freezing step is atomic with respect to any actions on the primary storage, and any transaction commit or abort.

Meanwhile there is a transactional request for page modification, for example updating the page D or a data object 103 on the page D, in the transaction level. To retain the consistency of the checkpointing, the frozen pages cannot be altered with regular transactional operations during the current checkpointing. This problem is overcome according to the invention by presenting "pending operations". Pending operation is an addition or removal of a data object so that the data object becomes visible to the transactions accessing the database but the concurrently ongoing checkpointing process takes special action on these data objects such as excluding the pending data from the data to be checkpointed.

After the previous checkpoint the disk space 107 of the secondary storage within the database file unit 16 contains the data objects from this checkpoint. Meanwhile the transactional request for page modification, for example updating a data object 103 on the page D, is accepted and consequently, the transactional modification of the page D is allowable during the checkpointing.

Lets presume that in the meanwhile the transactional request for page modification, for example updating the data object DO9 on the page D to be replaced by a new data object DO9' is allowed. Updating a data object at database page level is a combination of add and remove operations. Now according to the invention the added data object, i.e. the data object DO9' is supplemented with the pending add (PA) status information. The information about the new pending operation may also be added to a list of pending operations (not shown) And the current version of the data object to be updated, i.e. the data object DO9 is marked with pending remove (PR) data object from the list of pending operations (not shown). The pending add operation may be also called the pending insert operation, and the pending remove operation may be called the pending delete operation meaning the same thing respectively.

When the transactional modification to the page D occurs, the new data object DO9' is added to the page and marked with the pending add (PA) state information. The state information may for example be a flag in the data object itself and/or an entry in a list of pending operations. Because this example is about updating the data object DO9 with a new value (DO9'), the original DO9 data object is marked with pending remove information. When the checkpointing process starts writing the page D to the buffer location 105a in the disk buffer memory area 115, the checkpointing process includes only those data objects from the page that do not have a pending add operation information attached to them. Upon completing writing the page D 101a to the buffer location 105a and further to the secondary storage within the database file unit 16, the checkpointing process finalises the pending operations of the page D 101a by removing the original DO9 and permanently adding the DO9' to the list of data objects on the page D. The pending status of the added data object DO9' is removed as well.

As shown in FIG. 5c a physical page D 109 in the secondary storage within the database file unit 16 resides in the memory space 107 of the disk file. The data of the disk page D 109 is identical to the content of the buffer location 105a. Hence, it contains data objects DO9, DO10 and DO11, i.e. it is the consistent backup of the original page D 101 in the secondary storage.

Referring to FIG. 5a again, after writing the data objects DO9, DO10 and DO11 to the current checkpoint in the secondary storage, the checkpointing process alters the pending operations to be actual data on the page D as described later on.

After the transactional modification is committed, as will be discussed later, at the traction level during the current checkpointing on the page D 101a, the data object DO9 is replaced by the new data object DO9' and the data object DO9 is removed in this exemplary case. As part of the pending operations a link between data objects DO9 and DO10 is broken up and a new link between data objects DO9 and DO9' and DO9' and DO10 is opened up. Without further write operations to the page, the data objects DO9, DO9', DO10 and DO11 remain until the page is checkpointed. The extra memory resources are spent only for the data object DO9', not for the whole page. Finally, after the page D has been checkpointed, the pending operations can be made official, creating the page D 101b comprising data objects DO9', DO10, DO11 linked together as shown in FIG. 5a.

An optional transaction log resides in the secondary storage which lists information on all transactional modifications that have been committed during the database processing. The transaction log contains information about the write operations such as add and remove a data object or commit a transaction. According to the present invention, the transaction logging is not coupled with the checkpointing process. Thus the method present here produces a consistent checkpoint also without transaction logs.

FIG. 5d shows a situation of the page D 101a if another transactional update on DO9' is performed and while the page D is still frozen, the update is performed directly. DO9' already has a pending add operation on it, and is thus excluded from the checkpoint, and thus further altering it does not interfere with the consistency of the checkpoint. Lets presume that a transaction requests an update of DO9' to DO9". The new data object DO9" is added to page D as a pending operation. When the transaction commits, the old version DO9' is directly removed, even if the page is frozen. Finally, after the page D has been checkpointed, the page D 101b comprises data objects DO9", DO10, DO11 linked together as shown in FIG. 5d. The physical page produced by checkpointing the page D is depicted in FIG. 5d is exactly the physical page depicted in FIG. 5c. Similarly, if the DO9' is removed or committed by a transaction, the removal or commit is performed directly without a pending operation and the physical page produced from page D remains the one shown in FIG. 5c.

Figure 6:
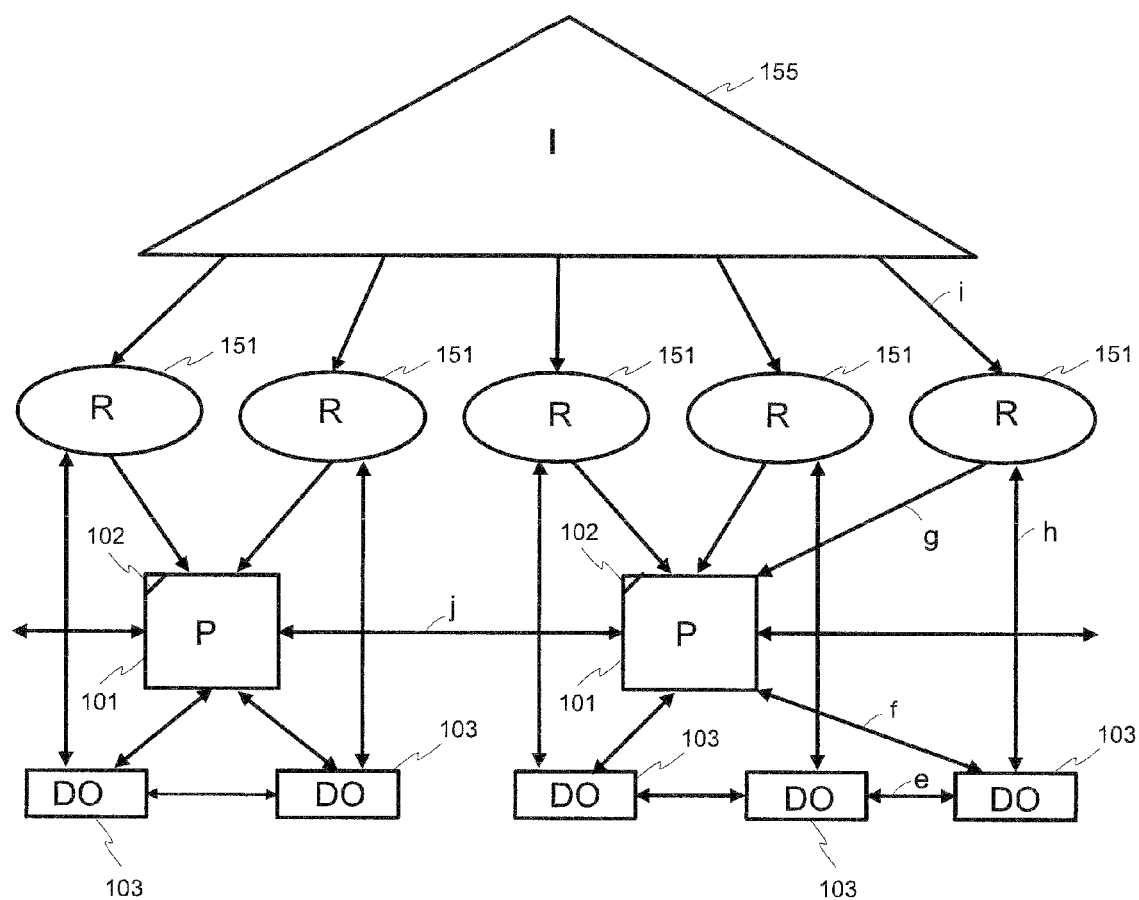
FIG. 6 depicts a basic structure of data at the storage level according to the invention.

Referring now to FIG. 6 each page P 101 contains a page header 102 and a set of data objects DO 103 for example in a doubly linked list (lines e, f). The pages 101 are arranged into a doubly linked list (line j). The data objects 103 are pointed to through row objects R 151 from the index structure 1155, which is used for transactional access to the data objects. This is arranged by a doubly linked list (line h) between rows and data objects. The page of the data object is found from the row object of the data object through a link (line g). The row objects 151 are a special layer connecting the indexes and the data objects by links (line i), and the rows are part of the transaction processing mechanism. For each data object linked to the row, the row has also a pointer to the page (not shown) that contains the data object. Each row object presents a distinct value in the index. If more than one version of the data object exist they are all linked to the same row. According to the invention the indexes 155 and row objects 151 are not included into the checkpointing.

Next the pending operations are discussed relating to FIGS. 7a-7e. The pending operations are finalised in the primary storage on the page D 101a after the page D has been written to the current checkpoint in the secondary storage as shown in FIG. 5a As already mentioned according to the invention the new data object DO9' is marked with the pending add (PA) operation and the current data object DO9 is marked with pending remove (PR) operation. While a transaction wants to make a new version of the current data object, at the storage level this is an add data object operation which is performed as a pending operation, because the page comprising this data object is frozen for checkpoint.

Figure 7A:
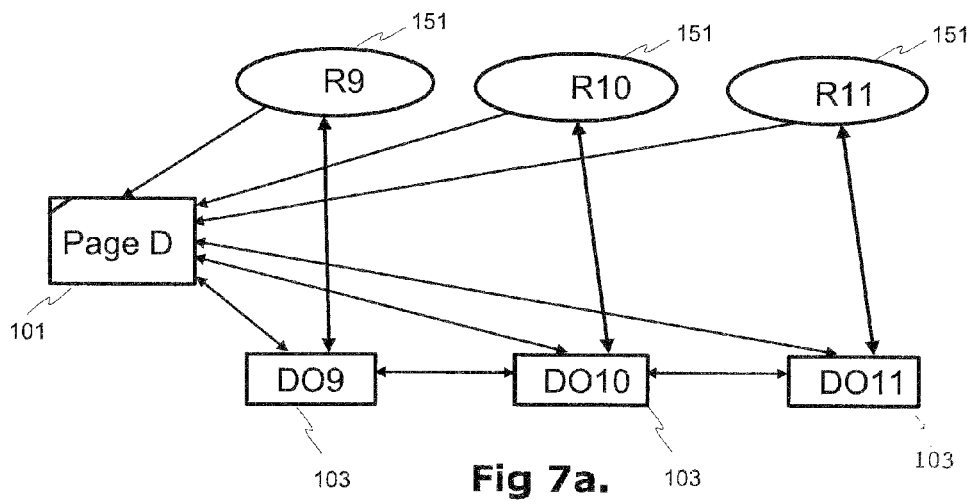
FIGS. 7a-7e depicts a block diagram of a performance of the pending operations on the page in the primary storage according to the invention.

As shown in FIG. 7a rows R9, R10 and R11 in a table have data objects: DO9, DO10 and DO11, respectively, residing on the frozen page D. This is the situation before the data object is modified. As described in accordance with FIG. 6 pages, rows and data objects are linked between each other in a way described therein. In this exemplary embodiment a transaction T wants to make a new version DO9' of the current data object DO9. For the sake of compactness, the indexing level on top of the rows is left out from FIGS. 7a-7e concerning only the storage level.

Figure 7B:
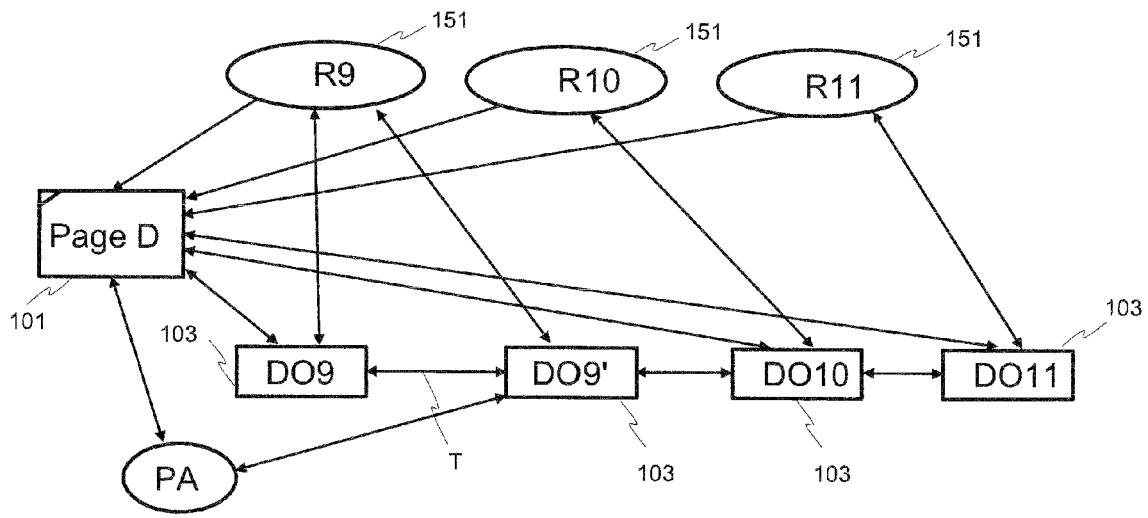

FIG. 7b shows the situation after the transaction T has modified the data object DO9, i.e. after updating DO9. The new data object DO9' is added to its normal position in the data object list of page D, but it is marked as a pending add PA and the pending operation is added to the list of pending operations of the page D. Because of the pending add, the data object DO9 ' is not yet considered as a "real" member of the page D, which means that DO9 ' is not included in the list of data objects to be written to the secondary storage from the page D. This situation is depicted in FIG. 7b.

Figure 7C:
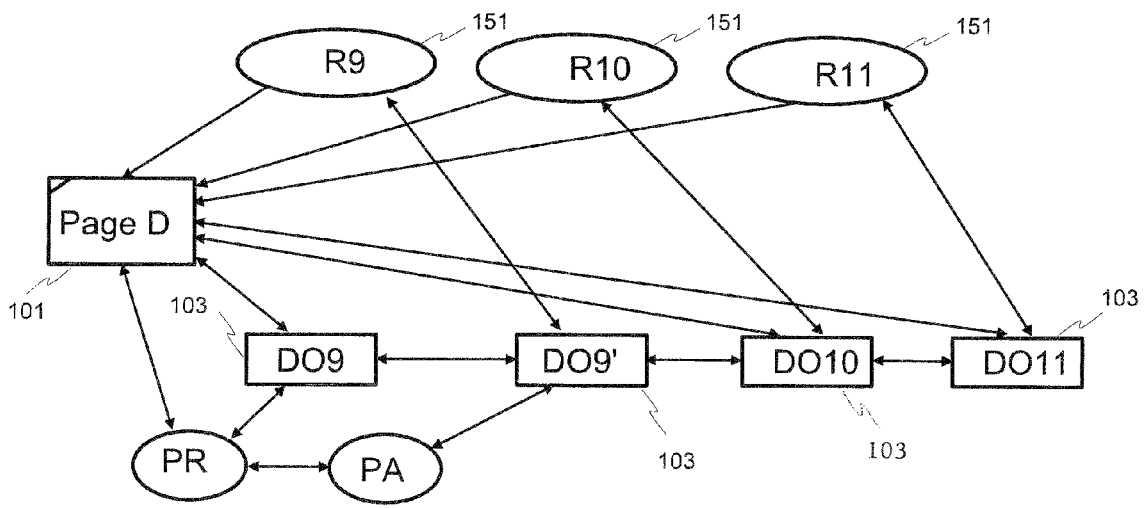
Figure 7D:
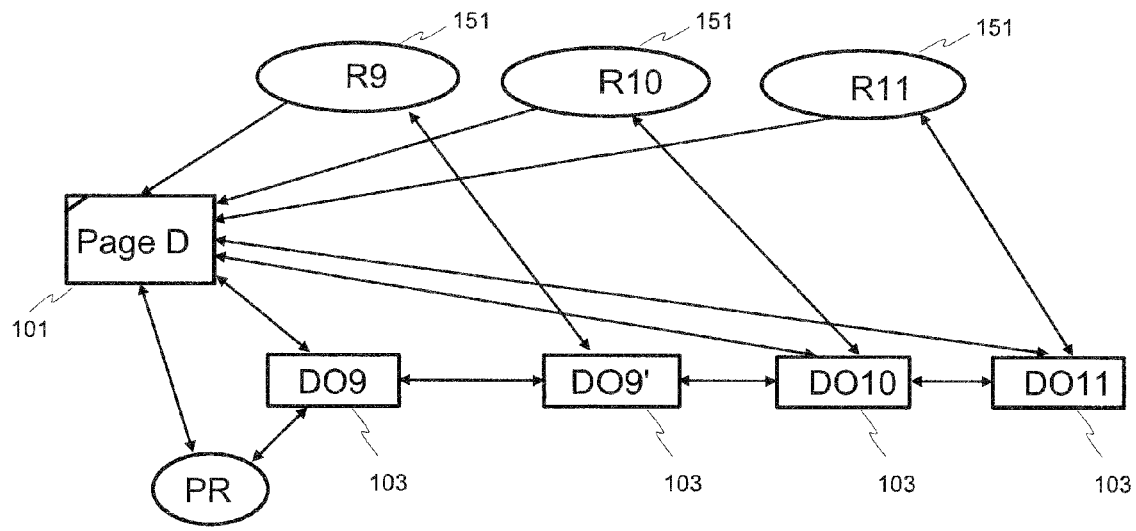
Figure 7E:
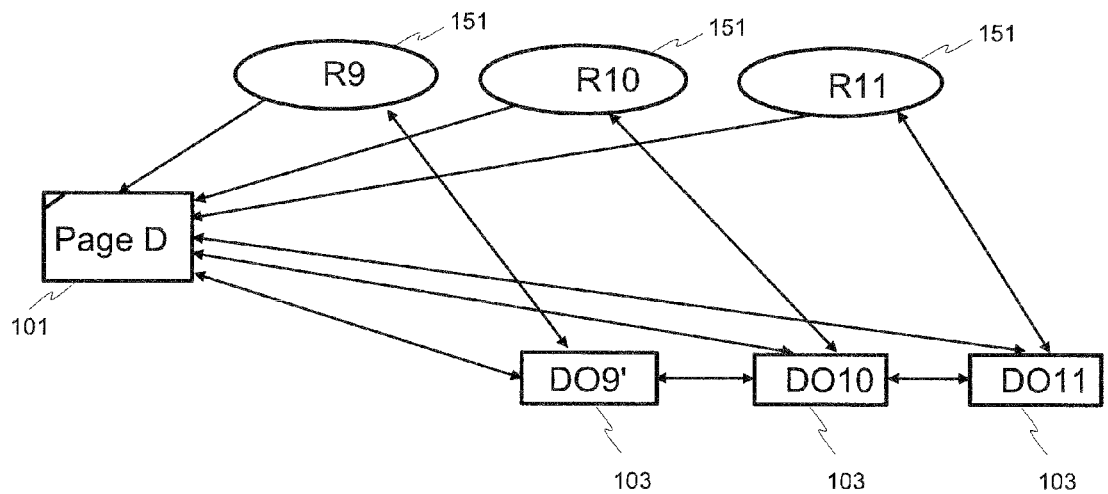

FIG. 7c shows the situation after the transaction is committed. Note that after the transaction T commits, the original version of the data object DO9, i.e. the previous current data object, is no longer accessible from row R9. As T commits, DO9' is transaction committed, and DO9 is marked with the pending remove PR operation (PR). FIG. 7d shows the situation after the pending add PA operation of FIG. 7c has been made permanent and FIG. 7e shows the situation after the pending remove PR operation of FIG. 7d has been made permanent.

Referring to FIGS. 8a-8d there is depicted a database structure according to another embodiment of the invention to make a consistent checkpoint while modifying data during the checkpointing of the relational MMDBMS. As shown in FIG. 8a leftward, the primary storage contains in this exemplary case a page E 101 comprising a page header 102 and a set of data objects 103, e.g. in this case DO12, DO13 and DO14 floating around the main-memory in a form of a logical page. When a checkpointing process begins, the page E is included in the list of pages belonging to the current checkpoint but it is not yet written to the secondary storage, i.e. it is "frozen" in the beginning of the checkpointing. Meanwhile there is a transactional request for page modification, for example updating a data object 103 on the page E, in the transaction level. To retain the consistency of the checkpointing the pending operations are used according to the invention as described earlier. With pending operations, data objects may be added or removed during the checkpoint. The data objects with a pending remove are referred to as pending remove data objects or simply pending removes in the following.

Lets presume that in the meanwhile the transactional request for page modification, for example updating the data object DO12 on the page E 101a to be replaced by a new data object DO 12' is allowed. Now according to the invention the new version of the data object to be modified on the page E 101a, i.e. the data object DO12 ' is marked with the pending add (PA) information. And the current version of the data object to be modified, i.e. the data object DO12 is marked with pending remove (PR) information, becoming a pending remove data object.

According to this embodiment, when the transactional modification to the page E 101a occurs, the data object DO12 which is marked with the pending remove (PR) operation is removed (detached) from the page E 101a and moved to another page G 201 in the primary storage. The page G 201 is called a pending removes page which is a special page for pending remove data objects from different pages. The moved data object DO12 is linked to information comprising the page or table identity of the page E 101a from which it was detached. The page G 201 also flushes to the secondary storage at times, when it becomes filled with pending remove data objects. Other possible pending remove data objects 203, e.g. DOX, DOXX etc., linked to their table or page information 205 are shown in FIG. 5a. The information of the table or page identity 205 associated with the respective data object 203 are copied to the buffer of disk page G 105b as shown in FIG. 8b, which disk page G is a physical page G 105b in the main-memory. Each pending remove data object with its table information 203, 205 is copied on the physical page G 105b separately and in sequential order in the same way as data objects marked with the pending operations are represented in the primary storage as described earlier in association with FIG. 5b. In this exemplary case the information 203, 205 is presented in the form: {page_id, DO12} in the buffer location 119b in the physical page G 105b.

When the page G 201 becomes full the physical page G 105b is written to the secondary storage in a separate memory location 109b than the backup copy of the page E 109 as shown in FIG. 1d. At the same time memory space is respectively released in the main-memory.

In addition to flushing the pending removes page, the pending remove data objects can be written to the secondary storage by copying them from the pending removes page to any empty space of a regular physical database page created during checkpointing, and releasing them from the pending removes page in the primary storage after copying.

As shown in FIG. 8b in the beginning the data object DO12 is not copied to the buffer location 105a when the page E is checkpointed, because DO12 is marked with the pending remove (PR) information. The physical page E 105a hence contain the data objects DO13 and DO14 which will be unchanged during the checkpointing. Then because the data object DO12 is marked with the pending remove (PR), DO12 is removed (detached) from the page E 101a and moved to another page G 201 in the primary storage according to this embodiment of the invention. Subsequently, the checkpointing process writes the buffer location 105a to page E 109 in the secondary storage within database file unit 16 as shown in FIG. 8c and releases the buffer location E 105a thereafter. The physical page E 109 resides in the memory space 107 of the disk file. Once the page G 201 containing pending removes in the primary storage fills up, the checkpointing process may make a copy of it to the buffer 105*b* and write the content of the buffer to the page on disk 109*b* and release the buffer 105*b* and page G 201 for subsequent pending removes.

After the data object DO12 is removed (detached) during the current checkpointing from the page E 101*a*, the data object DO12 is replaced by the new data object DO12' in this exemplary case as shown in FIG. 5*a*. As a consequence of removing DO12 also a link between data objects DO12 and DO13 is broken up on the page E 101*a* Then simply during the pending add (PA) operation directed on DO12' a new link between data objects DO12' and DO13 is opened up. Finally the page E comprises data objects DO12', DO13 and DO14, in the same way as shown in relation to page D 101*b* in FIG. 5*a*. This modified version is the only copy of the previous original page E 101 in the main-memory (primary storage). As consequence of this main memory resources are spent only for the data objects currently accessible by the transaction management system, i.e., the live data in the database.

According to this embodiment of the invention the consistent checkpointing is guaranteed, because the necessary information to bring the pages back to the consistent state resides in the checkpoint itself, stored in the secondary storage. By means of reading the information on the page E 109 and the page G 109*b* from the secondary storage the database is recovered and the consistent checkpointing is guaranteed. In this exemplary case, the necessary information is the row 119*b* from the page G 109*b* and the data objects DO13 and DO14 from the page E 109 as shown in FIGS. 8*c* and 8*d*.

Figure 9A:
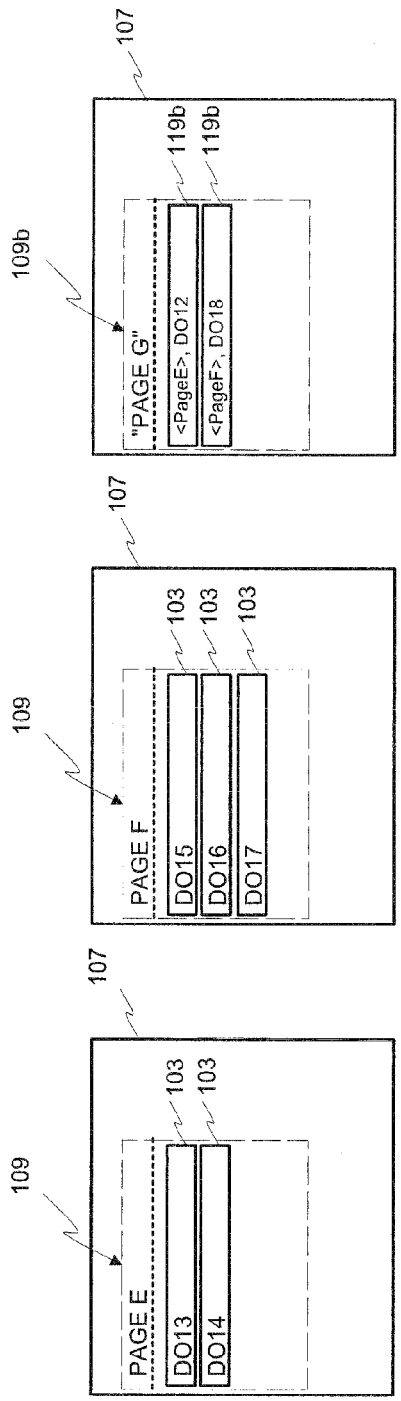
FIGS. 9a-9b depicts a block diagram of recovering a primary data storage from the secondary data storage according to another embodiment of the invention.
Figure 9B:
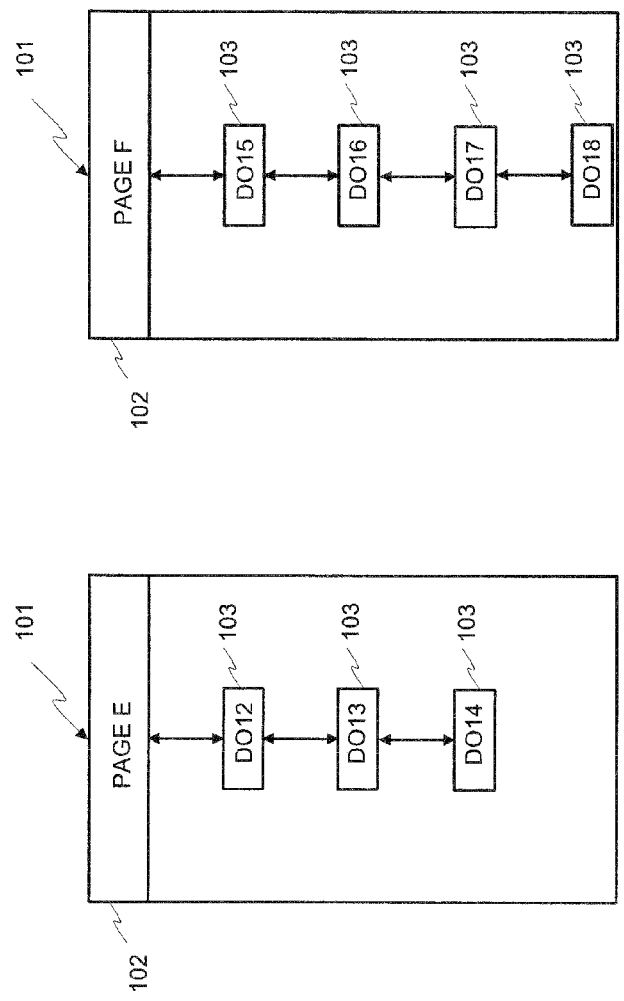

Referring to FIGS. 9*a*-9*b* there is depicted a method for recovering the main-memory database in primary storage from a checkpoint that has been stored in the secondary storage according to an embodiment depicted in FIGS. 8*a*-8*d*. Let's presume that after the checkpointing process the physical (disk) pages E and F 109, as well as G 109*b*, reside in the memory space 107 of the secondary storage in separate memory locations according to FIG. 9*a*. In this example, the page E 109 contains data objects DO13 and DO14 (see also FIG. 5*c*) and the page F 109 contains DO15, DO16 and DO17. When the main-memory database is recovered, the data-base pages E, F 109 are read from the secondary storage and corresponding pages E, F 101 are created in the primary storage. However, as described in the embodiment depicted in FIGS. 8*a*-8*d*, some data objects of the pages E and F 101 may have stored in the secondary storage on a separate page G 109*b* that contains data objects having pending remove status. When recovering the database, the pending remove operations must be undone. According to the invention, the information needed for the pending remove undo operation is stored in the pending removes page G 109*b* (see also FIG. 8*d*). The page G 109*b* contains information of the pending remove (PR) data objects, e.g. information of the page identity associated with the respective data object This information is presented in the form: {page_id, DO12} in the buffer location 119*b* in the physical page G 109*b*. This information contains the data object and information about the page to which the data object must be restored. In this example, the page G 109*b* contains information: table_id relating to the page E and DO12, table_id relating to the page F and DO18. Upon recovery, the database management system reads the contents of the pending removes page G 109*b* and puts the data objects DO12 and DO18 from the read page back to the original pages E and F 101 of the data objects, as shown in FIG. 9*b*. Consequently, after recovering process in the primary storage the page E contains again data objects DO12, DO13, DO14 and the page F data objects DO15, DO16, DO17, DO18.

According to the invention only the data object to be modified during the checkpointing is copied in the main-memory (primary storage), instead of the whole current page to be copied to the main memory as an identical copy of the page. The data objects of the original page D that remain unchanged during the current checkpointing and thus are not marked with pending operations are not copied in the primary storage according to the invention.

This embodiment of the invention is very resource efficient because there is no need to consume more than one page worth of memory space for pending remove operations. The pending remove data objects are detached from the original page and moved to a special pending remove page which is not a regular page of the database, but a special storage for pending removes. There is only a need to retain one page's worth of pending remove data objects, as earlier described, which consumes much less memory space than retaining a copy of all the pending remove data objects.

When making the pending operations permanent on the page following general notes is considered. The pending add requires no immediate processing, only the pending operation is removed. The data object is already in its right place on the page. The pending remove causes the data object to be removed. This also reduces the amount of space used by the data objects on the page. The pending commit causes the data object to be flagged as committed. This affects the amount of space taken by the data object, because the statement and transaction identities for this data object are no longer needed.

As an exemplary embodiment of a programmable software product for making a consistent checkpoint of a relational main-memory database in a database management system according to one embodiment of the invention is presented in the following in a form of exemplary software code listings.

A function Simple_Add performs adding of a tuple to a non-frozen page. It can be called directly when checkpointing is not underway, but is normally called from the Add function. All changes to the storage are performed directly by the Simple_Add function shown below.

```
Simple_Add (page, prev_tuple, new_tuple)
    if prev_tuple == NIL then
        page = create_page ( )
        page.add_first (new_tuple)
    else
        page.add_after (prev_tuple, new_tuple)
        if page.need_split ( ) then
            page1, page2 = page.split (50%)
            page1.dirty = TRUE
            page2.dirty = TRUE
        page.dirty = TRUE
```

A function Simple_Remove performs removing of a tuple from a non-frozen page. It can be called directly when checkpointing is not underway, but is normally called from the Remove function. All changes to the storage are performed directly by the Simple_Remove function shown below.

```
Simple_Remove (page, tuple)
    page.remove (tuple)
    free tuple
    if page.should_join_with (page.predecessor) then
        page.join_with (page.predecessor)
    elseif page.should_join_with (page.successor) then
        page.join_with (page.successor)
```

Add is a generic purpose function of adding a new tuple to a given page. The location of the tuple on the page is indicated by the prev_tuple argument, the new tuple is added after the prev_tuple. The page can be frozen or non-frozen. The Add function is shown below.

```
Add (page, prev_tuple, new_tuple)
    if page == NIL or NOT page.frozen then
        Simple_Add (page, prey_tuple, new_tuple)
    else
        pending_add = create_pending_add ( )
        pending_add.tuple = new_tuple
        tuple.pending_op = pending_add
        page.add_pending_op (pending_add)
        page.add_after (prev_tuple, new_tuple)
```

Remove is a generic purpose function for removing an existing tuple from a given page. The page can be frozen or non-frozen. The Remove function is shown below.

```
Remove (page, tuple)
    if NOT page.frozen then
        Simple_Remove(page, tuple)
    else
        old_pending_op = tuple.pending_op
        if old_pending_op is a pending add then
            page.remove_pending (old_pending_op)
            page.remove (tuple)
            free tuple
        else
            pending_remove = create_pending_remove ( )
            pending_remove.tuple = tuple
            tuple.pending_op = pending_remove
            page.add_pending (pending_remove)
```

Make_Checkpoint is a function for making a checkpoint of the database. The checkpoint is typically performed by a checkpoint thread, which calls this function, The Make_checkpoint function is described as follows.

```
Make_Checkpoint ( )
    for page in all database pages do
        if page.dirty then
            page.frozen = TRUE
    for page in all frozen pages do
        disk_page = create_disk_page ( )
        disk_page.copy_to (page.header)
        for tuple in page.tuples do
            pending_op = tuple.pending_op
            if pending_op == NIL
                or pending_op is not a pending add then
                disk_page.copy_to (tuple)
        for pending_op in page.pending_ops do
            tuple = pending_op.tuple
            switch type of pending_op
                case add:
                    # nothing needs to be done
                case remove:
                    page.remove (tuple)
            free pending_op
        if there were any pending operations then
            page.dirty = TRUE
            if page.should_join_with (page.predecessor) then
                page.join_with (page.predecessor)
            elseif page.should_join_with (page.successor)
                then
                page.join_with (page.successor)
            else
                while page.need_split ( ) do
                    page2, page = page.split (75%)
                    page2.dirty = TRUE
        else
            page.dirty = FALSE
            page.frozen = FALSE
            disk_page.write_to_disk ( )
```

Here, the lines 1 to 3 begin a checkpoint by freezing all the currently dirty pages. Lines 4 to 11 produce a physical page for disk writing. A new disk page is allocated, and for all tuples that do not have a pending add the tuple is copied to the disk page. Lines 12 to 19 make any pending operations on the page permanent. Lines 20 to 33 reset the page dirty and frozen statuses and perform any page splits or joins that are required after making the pending operations permanent. If there were any pending operations on the page the page is set dirty otherwise it is clean. All pages are unfrozen. Line 34 writes the just produced physical page to the disk. Lines 4 to 34 are performed to each frozen page in the database, after which the checkpoint is complete.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is intention, therefore, to be limited only as indicated by scope of the claims appended hereto.

The invention claimed is:

1. A method for making a consistent checkpoint of a computer database in a primary storage to a secondary storage, wherein the method comprises steps of:

beginning a process of checkpointing by identifying at least one page in a database to be checkpointed, said at least one page being on the primary storage and comprising at least one data object, each said at least one data object being free of any indication of a pending status concerning the at least one data object being altered subsequent to said at least one page being identified to be checkpointed;

after the beginning step, altering a first of said at least one data object by i) creating a new data object on said at least one page on said primary storage, ii) marking said new data object with a first pending status indicating that said new data object is an updatable copy of said at least one data object, and iii) marking said first data object with a second pending status indicating that said first data object will be replaced by said new data object with said first pending status after said first data object has been checkpointed, said new data object marked with said first pending status being accessible to transactions of said computer database on said primary storage;

buffering, to a buffer on said primary storage, each of said at least one data object free of any indication of a pending status and said first data object marked with said second pending status to form a buffered contiguous page on said primary storage, said contiguous page being free of said new data object marked with said first pending status;

writing said buffered contiguous page free of said new data object marked with said first pending status to the secondary storage; and after completing said writing step, replacing said first data object, having said second pending status and on said primary storage, with said new data object, and removing said first pending status from said new data object.

2. The method according to claim 1, further comprising a step of linking said new data object to one or more of said at least one data object on the at least one page.

3. The method according to claim 1, further comprising a step of linking said new data object to one of more of said at least one data object through which the new data object is accessible to said transactions of said computer database.

4. The method according to claim 1, further comprising a step of adding information related to at least one of the new data object marked with a second pending status and the first data object marked with a second pending status to a set of pending operations.

5. The method according to claim 1, further comprising a step of, prior to the replacing step, on said primary storage replacing said new data object with another new data object directly without producing an additional pending operation.

6. The method according to claim 1, wherein said replacing step removes said first data object from said at least one page on the primary storage.

7. The method according to claim 6, wherein the second pending status of the first data object is a remove pending status, and after said altering step and before said replacing step, said first data object is not visible to transactions accessing the at least one page.

8. The method according to claim 6, comprising the further step of where the first data object is included in a list of data objects that are written to the secondary storage prior to said replacing step.

9. The method according to claim 6, further comprising a step of:
removing at least one link to the first data object from one or more of said at least one data object.

10. The method according to claim 6, further comprising a step of:
removing at least one link to the first data object from one or more of said at least one data object through which the first data object is accessible to said transactions.

11. The method according to claim 6, further comprising a step of:
adding information about a pending operation status pertaining to removing the first data object to a set of pending operations.

12. The method according to claim 1, wherein said replacing step includes one of an adding step and a removing step.

13. The method according to claim 1, wherein the database in a main-memory database located in the primary storage and the secondary storage comprises a disk file database in a relational computer database management system.

14. The method according to claim 1, further comprising the steps of:
copying said at least one data object from a first page in the secondary storage to the primary storage, and
reading a removal pending status data object from a second page in the secondary storage and adding said another pending status data object to an original storage location in the primary storage as indicated by object identity information associated with the removal pending status data object.

15. The method according to claim 14, further comprising the steps of:
reading a first data of a first checkpointed database page from the secondary storage to the primary storage,
forming a first database page in said primary storage from said first data,
reading a second data from a pending removals page in the secondary storage, said second data containing the first data object and a first data identity information comprising an identification of a first location on said first database page to which the said first data object belongs, and
adding the first data object to the first location on said first database page indicated by said first data identity information.

16. A method according to claim 14, further comprising the steps of:
reading data of a checkpointed database page from the secondary storage to the primary storage,
forming a main-memory database table in said primary storage from said read data,
reading another data from a pending removals page on the secondary storage, said another data containing a data object and a data identity information comprising an identification of a location in said database table to which the said data object belongs, and
adding the data object read from the pending removals page back to the location in said database table as indicated by said data identity information.

17. The method according to claim 14, wherein the primary storage stores a main-memory database and the secondary storage is a disk file database in a relational database management system.

18. A method for making a consistent checkpoint of a computer database in a primary storage to a secondary storage, comprising the steps of:
beginning checkpointing by identifying a first page in a database to be checkpointed, said first page being on the primary storage and comprising plural data objects, each of said data objects being free of any indication of a pending status concerning any of said data objects being altered subsequent to said first page being identified to be checkpointed;

altering a first data object of said data objects by way of sub-steps comprising i) creating a new data object on said at least one page on said primary storage, ii) marking said new data object as pending with a first pending status indicating that said new data object is an updatable copy of said first data object, said new data object marked with said first pending status being accessible to transactions of said computer database, iii) marking said first data object with a second pending status indicating that said first data object will be replaced by said new data object with said first pending status after said first data object has been removed, iv) moving said first data object marked with said second pending status from said first page to a second page on the primary storage, and v) linking said first data object marked with said second pending status with a page identity information including a reference to the first page from which the first data object is moved from said first page in said moving step;

buffering said first data object marked with said second pending status and said linked page identity information to a first buffer on said primary storage;

writing said first buffer free of said new data object marked with said first pending status to said secondary storage;

buffering each of said data objects free of any indication of a pending status to a second buffer on said primary storage to form a buffered contiguous page, said contiguous page being free of said new data object marked with said first pending status;

writing said second buffer free of said new data object marked with said first pending status to said secondary storage; and after completing said altering step, replacing said first data object, removed from said first page to said second page, with said new data object in said first page, and, removing said first pending status from said new data object.

19. The method according to claim 1, wherein the at least one page, identified in said identifying step, is a logical page comprising data objects occupying said primary storage in a noncontiguous arrangement.

20. The method according to claim 19, wherein said data objects of said at least one page are sequentially linked with each other in the form of a linked list.

21. A method for making a consistent checkpoint of a computer database in a primary storage to a secondary storage, wherein the method comprises steps of:

identifying, from within a database management system formed of logical pages of data objects residing on a primary storage (10), one logical page, of the logical pages, to be checkpointed to a secondary storage;

allocating a physical contiguous area (105a) of the primary storage for the one logical page identified to be checkpointed;

after identifying the one logical page, modifying one data object of the data objects of the identified one logical page, the modifying of the one data object including providing a pending status marking to the one data object, the pending status marking indicating the modification of the one data object, remaining ones of the data objects of the indentified one logical page being free of any pending status marking indicating modification of the remaining data objects;

selecting at least the remaining ones of the data objects of the identified one logical page, and copying the selected data objects to the allocated physical contiguous area to form a contiguous page of the selected data objects of the one logical page within the physical contiguous area of the primary storage; and after said copying step, writing the contiguous page of the selected data objects from the physical contiguous area of the primary storage to the secondary storage to checkpoint the one logical page to the secondary storage.

22. The method of claim 21, wherein, the data objects of the logical pages are of a relational database management system residing discontiguously on the primary storage (10) as a doubly linked list, the allocated physical contiguous area in the primary storage is part of a main-memory, and the secondary storage is a disk of a database file unit (16).

23. The method of claim 21, wherein, during said copying step, the modified one data object with the pending status marking is copied to the physical contiguous area to form a part of the contiguous page, and during said writing step the modified one data object is part of the contiguous page written to the secondary storage in said writing step.

24. The method of claim 21, wherein, during said copying step, the modified one data object with the pending status marking is not copied, and during said writing step the modified one data object is not part of the contiguous page written to the secondary storage in said writing step.

25. The method according to claim 21, wherein said physical contiguous area (105a) comprises a buffer for a page image to be written to the secondary storage.

26. The method according to claim 1, wherein said process of checkpointing is free of a logging step of writing to a log table, said log table being stored separately from said at least one page in the database.

27. The method according to claim 18, wherein said data objects of said at least one page are sequentially linked with each other in the form of a linked list.

28. The method according to claim 18, wherein said process of checkpointing is free of a logging step of writing to a log table, said log table being stored separately from said first page in the database.

29. The method according to claim 21, wherein said identifying, allocating, modifying, selecting, and writing steps are free of a logging step of writing to a log table, said log table being stored separately from said logical pages in the database.

* * * * *

UNITED STATES PATENT AND TRADEMARK OFFICE
CERTIFICATE OF CORRECTION

PATENT NO. : 7,587,429 B2
APPLICATION NO. : 10/851214
DATED : September 8, 2009
INVENTOR(S) : Liedes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 692 days.

Signed and Sealed this

Twenty-first Day of September, 2010

David J. Kappos
*Director of the United States Patent and Trademark Office*